March 17, 1936.  D. C. HESSIAN  2,034,393
FLUID PRESSURE BRAKE
Filed Feb. 23, 1932  2 Sheets-Sheet 2

INVENTOR
Dennis C. Hessian
BY
J. S. Murray
ATTORNEY

Patented Mar. 17, 1936

2,034,393

UNITED STATES PATENT OFFICE 2,034,393

FLUID PRESSURE BRAKE

Dennis C. Hessian, Detroit, Mich.; Anna Dalton executrix of said Dennis C. Hessian, deceased Application February 23, 1932, Serial No. 594,425

22 Claims. (Cl. 303—59)

This invention relates to fluid pressure brakes and particularly to valve mechanisms controlling the admission and exhaust of air or other energizing fluid to brake cylinders.

Objects of the invention are to provide a simplified valve mechanism for the specified purpose; to provide for charging a brake cylinder either from an auxiliary reservoir at a predetermined maximum pressure or from one or more additional auxiliary reservoirs at a selectively higher pressure; to at times charge the brake cylinder to a pressure exceeding that ordinarily maintained in the train line and, in releasing the brakes, to utilize a portion of such charge to assist in building up train line pressure; and to so combine a diaphragm and piston as to establish a very complete seal against fluid flow past the piston.

These and various other objects the invention attains by the construction hereinafter described, and illustrated in the accompanying drawings, wherein:

Fig. 3 is a similar view of the upper portion of said mechanism, showing an effective position of response of the mechanism to a train line reduction.

Fig. 3a is a sectional detail taken on the line 3a—3a of Fig. 3, primarily showing a notched valve seat.

Fig. 4 is a sectional detail of a check valve employed in the apparatus.

Figure 1:
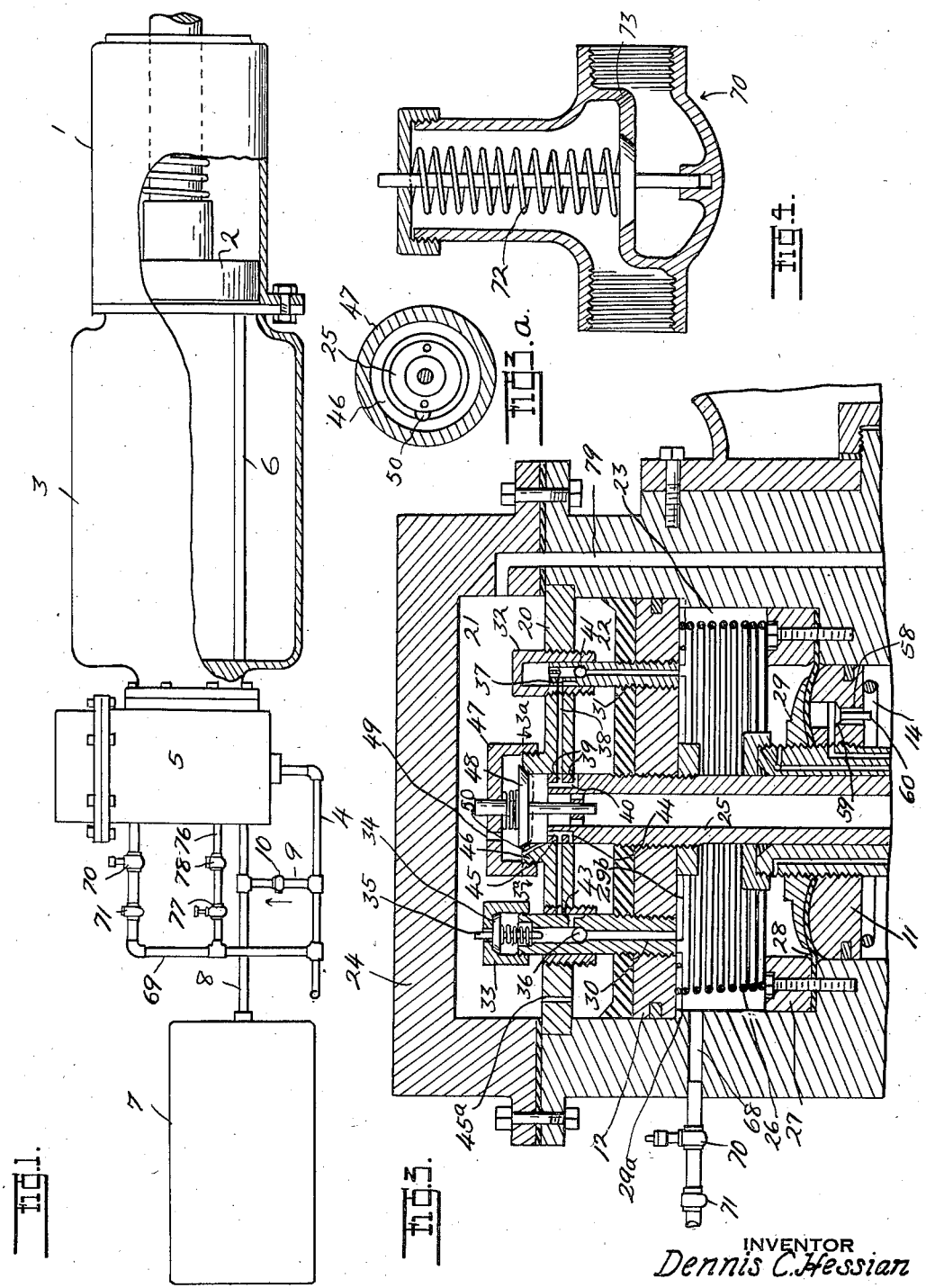
Fig. 1 is a view in side elevation and partial section of fluid brake mechanism embodying the invention.

In these views, the reference character 1 designates a brake cylinder and 2 the piston thereof. For energizing said piston, air (or other suitable fluid) may be delivered to said cylinder from a reservoir 3 of suitable capacity. Said reservoir is adapted to be charged from the usual train pipe 4, and a valve mechanism carried by a casing 5 controls both the charging of said reservoir and air delivery therefrom. As illustrated, the brake cylinder and casing 5 are secured to opposite ends of the reservoir 3, and a pipe 6 extends from said casing through the reservoir for delivering air to and from said cylinder.

The apparatus further comprises a reservoir 7 wherein air may be stored at a pressure considerably higher than is normally maintained in the reservoir 3, and from which a delivery pipe 8 leads to the casing 5. For charging this high pressure reservoir, a pipe 9 extends from the train pipe to the pipe 8, a check valve 10 preventing return flow.

Coaxially reciprocatory in the casing 5 are two spaced pistons 11 and 12, of differential areas. The piston 11 operates within the upper end of a chamber 13 formed centrally in the valve casing, down travel of said piston being opposed by a spring 14 in said chamber. A tubular stem 15 rigidly engaging said piston extends centrally downward through the chamber 13 and is enlarged below the latter to form a head 16. The latter reciprocates in a chamber 17 formed in the lower portion of the valve casing and closed by a plug 18 threaded into said portion.

Within the chamber 13, the stem 15 slides in a sleeve 19, flanged at its lower end to provide a seat for the spring 14, and also flanged at its upper end for a purpose hereinafter set forth.

The piston 12 reciprocates in a chamber occupying the upper portion of the casing 5, subdivided by said piston and by a partition 20 into an upper space 21, an intermediate space 22 and a lower space 23, hereinafter termed the pressure chamber. Said partition is clamped between the casing proper and a removable cap 24 surmounting the casing, said space 21 being formed in said cap.

A tubular stem 25, rigidly and centrally carried by the piston 12 has a short portion projecting above the latter, passing through the space 22 and slidably fitting in the partition 20, and a relatively long downwardly projecting portion passing through the space 23 and chamber 13 and sliding in the stem 15.

A spring 26, considerably lighter than the spring 14, is positioned in the pressure chamber 23 to urge the piston 12 upwardly. As illustrated, the spring 26 is seated by a ring 27, serving to clamp to the casing 5 the outer margin of a flexible diaphragm 28 having its inner margin clamped to the piston 11 by a nut 29. Said diaphragm and piston together establish a very effective air seal between the chamber 13 and overlying pressure chamber.

Downward travel of the piston 12 is limited by its engagement with a series of stops 29a formed integrally with the wall of the pressure chamber and rising from an annular shoulder 29b on said wall.

Rigidly and eccentrically carried by the piston 12 is a pair of hollow valve stems 30 and 31 which project upwardly through the partition 20 and are slidable in bushings 32 and 32' in said partition. Above the partition, the stem 30 rigidly carries a head 33 wherein a valve member 34 is spring-urged to its seat to cut off upflow of air through said stem. A stem 35 projects from said valve member above the head 33 to unseat said valve member by engagement with the cap 24 when the piston 12 is in limiting raised position. A downwardly seating ball check 36 further controls air flow through the stem 30.

The stem 31 is closed at its upper end and below said end has an orifice 37 in constant communication with a radial passage 38 in the partition 20. Said passage leads to the stem 25 and is registrable in predetermined positions of said stem with vertically spaced ports 39 connected by a passage 40 opening in the upper end of said stem. A check valve 41, resisting down flow, is positioned in the stem 31 below the orifice 37 thereof.

Preferably the partition 20 is formed with another radial passage 42, extending between the stems 25 and 30 and having constant communication with an orifice 43 in the stem 30 and registrable in predetermined positions of the stem 25 with vertically spaced ports 44 connected by a vertical passage 45 opening in the upper end of said stem.

A passage 45a in the partition 20 effects equalization of pressures in the spaces 21 and 22.

Figure 2:
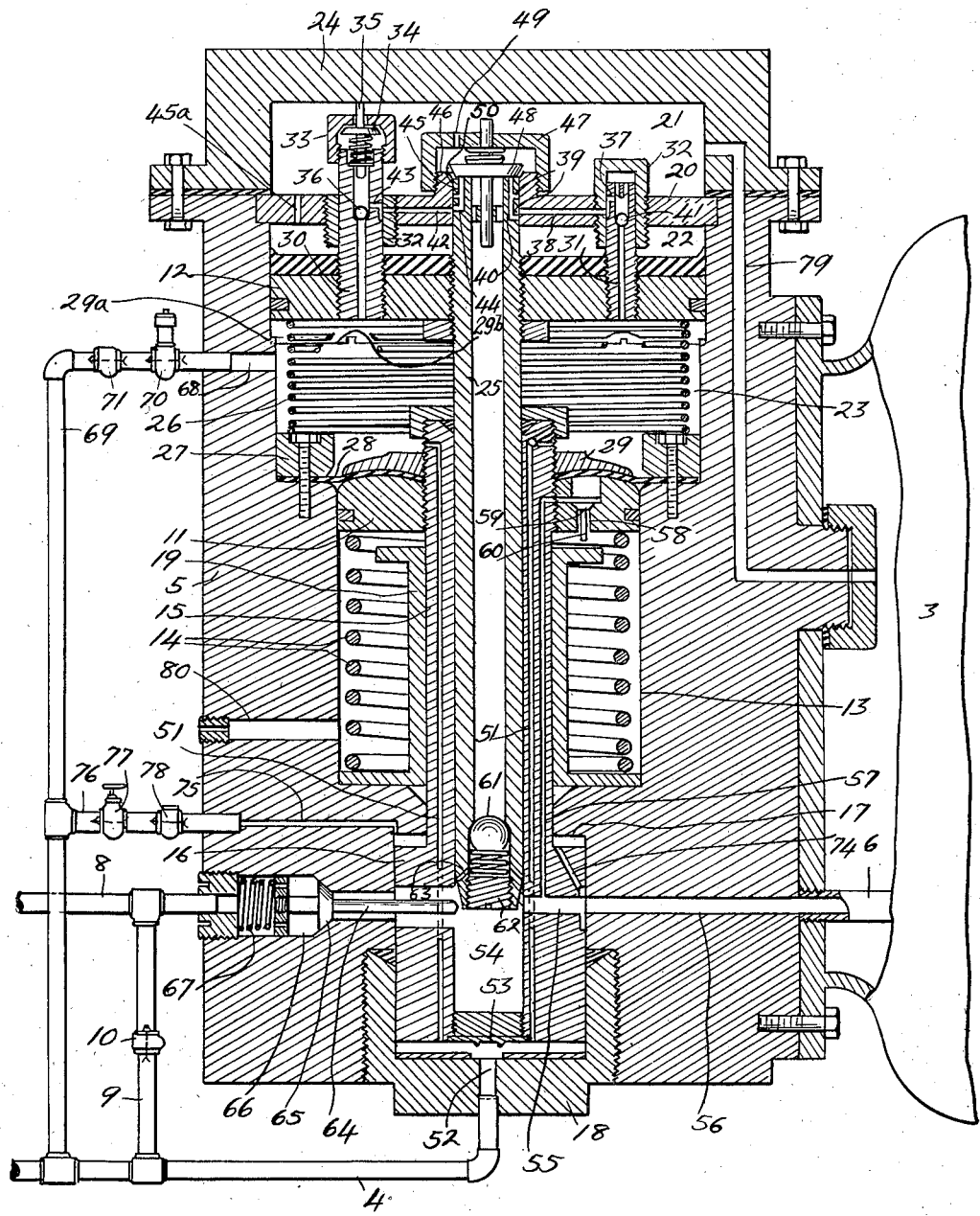
Fig. 2 is an axial sectional view of the valve mechanism primarily constituting the present improvement, said mechanism being shown in an initial position of response to a train line reduction.

Surrounding the upper end of the stem 25 is a nipple 46 rising from the partition 20, on which nipple a cap 47 is threaded. Within said cap a valve member 48 is spring-urged to seat alternatively on said nipple (Fig. 3) or on the upper end of the stem 25 (Fig. 2), according as said end drops below or projects above the top of said nipple. Said cap has an inlet 49 thereto from the space 21 and the nipple 46 has a notch 50 in its beveled valve-seating face, affording a predetermined air flow across said face, when the valve member is seated thereon.

The stem 15 has one or more passages 51 primarily serving to deliver train pipe air to the pressure chamber 23. Said passages open through the lower face of the head 16 into the chamber 17, through which air may be delivered to said passages from an opening 52 in the plug 18, which opening places the train pipe in communication with said chamber. A valve member 53, carried by the head 16 is adapted to close the opening 52 in a limiting lowered position of said head. Said valve member preferably has the nature of a plug closing the lower end of a chamber 54 formed in the head 16 below the stem 25. Said chamber is in constant communication with the pipe 6 by a passage 55, 56 formed jointly in the head 16 and casing 5. A vent passage 57 for the brake cylinder rises through the stem 15 from the passage 55, its upper end being connected to a port 58 opening downwardly in the piston 11, and controlled by a valve member 59. A stem 60 depending from said valve member is engageable, through lowering of the piston 11 from its uppermost position, with the flanged upper end of the sleeve 19, to unseat said valve member.

Spring seated in the lower portion of the stem 25 is a ball check valve 61, opposing upflow of air through said stem. The lower end of said stem is closed by a plug 62, and one or more outlets 63 lead from the central passage of said stem, beneath the valve 61, and open in a conically beveled face exteriorly formed on the lower end portion of said stem.

As the stem 25 assumes a lower limiting position, said beveled face thereof engages a stem 64 upon a valve member 65 controlling a passage 66 leading to the chamber 54 from the pipe 8, and said valve member is thereby unseated. A spring 67 resists unseating of said valve member.

To withdraw air from the pressure chamber 23 by reduction of train pipe pressure, a passage 68 leads from said space to a pipe 69 connecting with the train pipe. In said pipe are interposed check valves 70 and 71 successively encountering discharging air and resisting back flow through said pipe. The check valve 70 which initially encounters air flowing to the train pipe is seated under predetermined pressure by a spring 72 which requires a pressure reduction in the train pipe about five pounds below that in the chamber 23 to permit opening of said valve. Also a small leakage aperture 73 is provided in the seat-forming web of the valve 70. The other check valve 71 may be of ordinary construction.

Under conditions hereinafter explained, air exhausting from the brake cylinder may be delivered to the brake pipe. For this purpose a passage 74 formed in the head 16 leads from the passage 55, discharging in the top face of said head, and a passage 75 opening in the top face of the chamber 17 leads to a pipe 76 controlled by valves 77 and 78 and connected to the train pipe either directly or as illustrated through the pipe 69. Thus the chamber 17 connects the passages 74 and 75 when the head 16 is lowered or partially lowered, such connection being cut off when said head seats against the upper end of said chamber. The valve 77 is manually controlled and the valve 78 resists flow except toward the train pipe.

The casing 5 is further formed with passages 79 and 80, the former connecting the reservoir 3 with the space 21, and the latter venting the chamber 13 to atmosphere.

Charging the reservoir 3 is effected by a flow of air from the train pipe, by way of the opening 52, passage 51, pressure chamber 23, stem 30, space 21 and passage 79. It will, of course, be understood that the piston 11, during charging, is in its raised limiting position established by engagement of the head 16 with the top of the chamber 17, and that the piston 12 is likewise fully raised by its spring 26, to a position established by the bushings 32 and 32'. The valve member 53 therefore uncovers the opening 52 and the valve member 34 is unseated through engagement of its stem with the cap 24. Also the valve member 48 will be raised by the stem 25 clear of the nipple 46, thus closing the main passage through said stem, as well as the auxiliary passages 40 and 45 (see Fig. 2).

Charging of air to the reservoir 7 is at the same time accomplished by way of the pipes 9 and 8. It is preferred to establish a considerably higher pressure in the reservoir 7 than that which the spring 14 establishes for the reservoir 3. Thus if air delivery to the reservoir 3 is cut off at seventy pounds pressure, a pressure of between one hundred and one hundred and twenty-five pounds may be built up in the reservoir 7, by temporarily establishing a train pipe pressure of that magnitude. After building up the desired pressure in the reservoir 7, the train pipe pressure may be reduced back to a safe excess over pressure in the reservoir 3.

When pressure in the pressure chamber 23, reservoir 3, and spaces 21 and 22 reaches a magnitude predetermined by the spring 14 (as for example, seventy pounds), the piston 11 is lowered, seating the valve member 53, thus cutting off delivery of train pipe air, and unseating the air vent valve member 59. Under resulting conditions, air pressure above and below the partition 20 is equalized by flow through the passage 45a, and consequently pressures above and below the piston 12 are equalized.

The lower end of the stem 25 will be clear of the stem 64, allowing the valve member 65 to seat and prevent air delivery from the high pressure cylinder 7, and the brake cylinder will be vented by way of the pipe 6, passages 55, 56, and 57, and port 58.

In applying the brakes, train pipe pressure is reduced according to the desired braking intensity, thereby withdrawing air from the pressure chamber 23 through the pipe 69, the check valve 71 freely unseating to permit such withdrawal. The check valve 70, as has been stated, will not unseat until train pipe pressure has fallen to a predetermined amount below that in the chamber 23, as for example five pounds. This has the effect of lowering the train pipe pressure substantially throughout the train length, before the valve mechanisms on the individual cars respond to the pressure reduction, and hence tends toward concurrent response of said valve mechanisms.

If the train pipe reduction is not of sufficient magnitude to effect unseating of the valve 70, there will nevertheless occur a gradual pressure reduction in the chamber 23 due to discharge through the port 73, whereby a moderate application of the brakes will result.

Since the check valves 36 and 41 prohibit downflow through the stems 30 and 31, and since the spaces 21 and 22 communicate at 45a, withdrawal of air from the pressure chamber 23 quickly establishes a preponderance of pressure above the piston 12 effective to lower the latter proportionately to the pressure reduction. At the same time, or shortly subsequent, the spring 14 fully raises the piston 11.

Lowering of the piston 12 effects seating of the valve 34 and a transfer of the valve member 48 from the stem 25 to the nipple 46, whereby air may flow from the space 21 into the main passage of said stem through the port 49 and notch 50, and may further enter the passages 40 and 45. Also, if the pressure reduction in the space 23 is sufficient to establish the extreme lowered position of the stem 25, the tapered lower end of said stem will outwardly shift the stem 64 to unseat the valve member 65.

Raising of the piston 11 will permit the valve member 59 to seat, closing the port 58 which normally vents the brake cylinder. Also the head 16 will be carried up by the piston 11, unseating the valve member 53 and permitting the passages 51 to supplement the pipe 69 in withdrawing air from the space 23.

Under these conditions, air will be delivered from the reservoir 3 to the brake cylinder, through the passage 79, chamber 21, aperture 49, notch 50, main passage of the stem 25, (unseating the check valve 61), chamber 54, passage 55, 56, and pipe 6. The resulting brake cylinder pressure will be proportionate to the magnitude of the train line reduction, since pressure in the communicating spaces 21 and 22 will fall in correspondence with the pressure reduction in the auxiliary reservoir, and the piston 12 will be raised by its spring 26 as soon as pressures above and below said piston are equalized. In rising, the piston 12 will transfer the valve member 48 from the nipple 46 to the upper end of the stem 25, thus cutting off further air delivery to the brake cylinder.

When the train line reduction is of emergency magnitude, the resultant lowering of the piston 12 and stem 25 will, as aforestated, act through the stem 64 to unseat the valve member 65. This will establish a flow of air to the brake cylinder from the high pressure cylinder 7, so as to immediately build up a high pressure in the brake cylinder, effecting maximum retardation.

When after an emergency application of the brakes, it is desired to release the brakes, while the train is still in motion, the fact that the release takes effect progressively from the front to the rear end of the train tends to produce a series of impacts, this being particularly true of long trains.

The present invention substantially eliminates this tendency by venting the brake cylinders to the train pipe until equalization is established and then venting to the atmosphere.

Thus when normal pressure (sufficient to overcome the spring 14) is being restored in the train line, and the piston 11 starts down, the passages 74 and 75 are uncovered in advance of unseating of the valve member 59. This allows the brake cylinder to vent to the train pipe, as follows: pipe 6, passage 55, 56, chamber 17, passage 75, and pipe 76. Thus, until equalization is established the air venting from the brake cylinders of the train assists in building up train line pressure, instead of being completely wasted by atmospheric venting, as in present practice. If for any reason it is desired to vent the brake cylinders only to the atmosphere, the valve 77 may be closed.

During down travel of the piston 12 the uppermost ports 39 and 44 successively are placed in registration with the passages 38 and 42 and said ports are relatively increased slightly in size in the order of their registration with said passages. This has the effect, during a braking control, of placing the pressure chamber 23 in communication with the main passage of the stem 25, so as to expedite reduction of pressure in said space by a discharge through said stem to the brake cylinder, as well as by withdrawal into the train pipe. The variation in size of the individual ports 39 and 44 is such that the venting effected by said ports increases proportionately to the extent of downward actuation of the stem 25.

The two lowermost ports 39 and 44 are placed in communication with the space 22 when the train pipe reduction is of emergency magnitude.

The check valve 61 seats to prevent high pressure air from the reservoir 7 from flowing up through the stem 25, when such air is being delivered to the brake cylinder.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. In a fluid pressure brake, a train pipe, a reservoir, a pressure chamber having opposed yieldable walls, a fluid delivery connection from the train pipe to said chamber, a fluid delivery connection from said chamber to the reservoir, and means for controlling said connections respectively by the yielding of the respective walls 2. In a fluid pressure brake, a train pipe, a reservoir, a pair of pistons movable to and from each other, a casing receiving the pistons and forming a pressure chamber between the pistons, fluid delivery connections from the train pipe to the pressure chamber and from said chamber to the reservoir, and control means for the respective connections carried by the respective pistons.

3. In a fluid pressure brake, the combination with a train pipe and a reservoir, of a pressure chamber having opposed walls movable to and from each other to expand or contract said chamber, fluid delivery connections from the train pipe to said chamber and from said chamber to the reservoir, means upon one of said walls for establishing or cutting off said delivery connection to said chamber according as said wall yields to or overcomes pressure in said chamber, and means carried by the other wall for establishing or cutting off said delivery connection to the reservoir according as said other wall yields to or overcomes pressure in said chamber.

4. In a fluid pressure brake, the combination with a train pipe, a brake cylinder, and a fluid delivery connection from the train pipe to the brake cylinder, of an expansible pressure chamber, means for opening and closing said fluid delivery connection accordingly as said chamber is contracted or expanded, a fluid delivery connection from said train pipe to said chamber, and a second connection from said chamber to said train pipe for withdrawing fluid from said chamber.

5. In a fluid pressure brake, as set forth in claim 4, a check valve in said second connection prohibiting flow therethrough from the train pipe to said chamber.

6. In a fluid pressure brake, the combination with a train pipe, a brake cylinder, and a reservoir, of a pressure chamber having opposed yieldable walls, a fluid delivery connection from the train pipe to said chamber, means for controlling said connection by movement of one of said walls to and from the other, fluid delivery connections from said chamber to said reservoir and from the reservoir to the brake cylinder, and means for controlling the last-named connections through yielding of the other of said walls.

7. In a fluid pressure brake, the combination with a brake cylinder and a fluid reservoir, of a pressure chamber having a wall yieldable under pressure in said chamber, a duct carried by said wall and extending through said chamber and establishing a fluid delivery connection from said reservoir to said brake cylinder, and means for establishing or cutting off a flow through said duct according as said wall overcomes or yields to pressure in said chamber.

8. In a fluid pressure brake, the combination with a train pipe, and a reservoir, of a pressure chamber having a yieldable wall, a fluid delivery connection from the train pipe to said chamber, said wall having an opening for the delivery of fluid from said chamber to said reservoir, a valve controlling said opening and means for seating or unseating said valve accordingly as said wall overcomes or yields to pressure in said chamber.

9. In a fluid pressure brake, the combination with a train pipe, a brake cylinder, and a reservoir, of a pressure chamber having a yieldable wall, and having an opening in said wall for the delivery of fluid from said chamber to said reservoir, a valve member controlling said opening, a duct carried by said yieldable wall and extending through said chamber for delivering fluid from the reservoir to the brake cylinder, means for seating or unseating said valve member accordingly as said wall overcomes or yields to pressure in said chamber, means for establishing or cutting off a flow through said duct accordingly as said wall yields to or overcomes pressure in said chamber, and a fluid delivery connection from the train pipe to said chamber.

10. In a fluid pressure brake, the combination with a train pipe, a brake cylinder, and a reservoir, of a non-return fluid delivery connection from said train pipe to said reservoir, a fluid delivery connection from said reservoir to the brake cylinder, and a non-return fluid discharge connection from the brake cylinder to the train pipe.

11. In a fluid pressure brake, a train pipe, a brake cylinder, a low pressure fluid reservoir, a high pressure fluid reservoir, means for charging said reservoirs from the train pipe, fluid delivery connections from said reservoirs to said brake cylinder, a valve controlling the low pressure fluid connection, a valve controlling the high pressure fluid connection, and means for unseating the first mentioned valve responsive to a train pipe reduction and for additionally unseating the second mentioned valve relative to a greater train pipe reduction.

12. In a fluid pressure brake, a train pipe, a brake cylinder, a low pressure fluid reservoir, a high pressure fluid reservoir, means for charging said reservoirs from the train pipe, an expansible pressure chamber, means for delivering fluid from the train pipe to said pressure chamber and for withdrawing fluid from said chamber into the train pipe, means for placing said low pressure reservoir in communication with the brake cylinder responsive to a predetermined contraction of said pressure chamber, and means for placing said high pressure reservoir in communication with the brake cylinder responsive to a further contraction of said pressure chamber.

13. In a fluid pressure brake, a train pipe, a reservoir, an expansible pressure chamber, a fluid delivery connection from the train pipe to said chamber, a fluid delivery connection from said chamber to the reservoir, means for controlling both of said connections through expansion and contraction of said chamber, and a separate connection from said chamber to the train pipe for withdrawing air from said chamber.

14. In a fluid pressure brake, a train pipe, a brake cylinder, a low pressure fluid reservoir, a high pressure fluid reservoir, a fluid delivery connection from the train pipe to the high pressure reservoir, an expansible pressure chamber, a fluid delivery connection from the train pipe to said chamber, a fluid delivery connection from said chamber to the low pressure reservoir, fluid delivery connections from said reservoirs to the brake cylinder, and means for controlling the last-named connections through expansion and contraction of said chamber.

15. In a fluid pressure brake, a train pipe, a brake cylinder, a reservoir, a non-return fluid delivery connection from said train pipe to said reservoir, an expansible pressure chamber, means for regulating pressure in said chamber by variations of train pipe pressure, a delivery connection from said reservoir to the brake cylinder, and means for controlling the last-named connection by expansion and contraction of said chamber.

16. In a fluid pressure brake, the combination with a brake pipe, a brake cylinder, a high pressure fluid reservoir and a low pressure fluid reservoir, of an expansible pressure chamber, a fluid delivery connection from the train pipe to said chamber, a fluid delivery connection from said chamber to the low pressure reservoir, delivery connections from both said reservoirs to the brake cylinder, means for controlling all of said connections through expansion and contraction of said chamber, a non-return fluid delivery connection from the train pipe to the high pressure reservoir, and a second connection between the train pipe and said chamber for withdrawing fluid from said chamber.

17. In a fluid pressure brake, a train pipe, a brake cylinder, a reservoir, a pressure chamber, having a wall thereof yieldable to provide for an expansion and contraction of said chamber, said wall having an opening for the delivery of fluid from the pressure chamber to the reservoir, a fluid delivery connection from the reservoir to the brake cylinder, means for opening or closing said opening accordingly as said wall overcomes or yields to pressure in said chamber, and means for opening or closing said connection accordingly as said wall yields to or overcomes pressure in said chamber.

18. In a control device for fluid pressure brakes, a train pipe, an expansible pressure chamber, a fluid delivery connection from the train pipe to said chamber, a separate connection for returning fluid to the train pipe from said chamber, means preventing flow through the last mentioned connection from the train pipe to said chamber, and means yieldably offering a predetermined resistance to flow through the last mentioned connection to the train pipe.

19. In a fluid pressure brake, the combination with a low pressure auxiliary reservoir, a high pressure auxiliary reservoir, means for differentially charging said reservoirs, and a brake cylinder, of a valve mechanism comprising valves individually controlling fluid delivery from each of said reservoirs to the brake cylinder, and a member movable in one direction to unseat the valve controlling delivery from the low pressure reservoir, and further movable in the same direction to unseat the valve controlling delivery from the high pressure reservoir, said valve unseating member having a passage for fluid delivery to the brake cylinder from the low pressure reservoir.

20. In a fluid pressure brake, the combination with a low pressure auxiliary reservoir, a high pressure auxiliary reservoir, means for differentially charging said reservoirs, and a brake cylinder, of a valve mechanism comprising valves individually controlling fluid delivery from each of said reservoirs to the brake cylinder, and a member movable in one direction to unseat the valve controlling delivery from the low pressure reservoir, and further movable in the same direction to unseat the valve controlling delivery from the high pressure reservoir, said member being reciprocatory and acting on said valves at its opposite ends.

21. In a fluid pressure brake, the combination with a low pressure auxiliary reservoir, a high pressure auxiliary reservoir, a train pipe, and a brake cylinder, of a valve mechanism comprising a valve cutting off train pipe communication with the low pressure reservoir at a predetermined train pipe pressure, valves individually controlling fluid delivery from said reservoirs to the brake cylinder, and a member movable in one direction to unseat the valve controlling delivery to the low pressure reservoir, and further movable in the same direction to unseat the valve controlling delivery to the high pressure reservoir.

22. In a fluid pressure brake, a train pipe, a brake cylinder, a low pressure air reservoir, a high pressure air reservoir, delivery connections to such reservoirs from the train pipe, means opposing return flow through the delivery connection to the high pressure reservoir, an expansible and contractible pressure chamber, a spring resisting expansion of such chamber, normally closed delivery connections to the brake cylinder from the low and high pressure reservoirs, means for opening the low pressure connection to the brake cylinder responsive to a predetermined contraction of the pressure chamber, and means for opening the high pressure connection to the brake cylinder responsive to a further contraction of the pressure chamber.

DENNIS C. HESSIAN.